US012592625B2

(12) United States Patent
Reinthaler

(10) Patent No.: US 12,592,625 B2
(45) Date of Patent: Mar. 31, 2026

(54) PERMANENT MAGNET ARRANGEMENT OF A SHUTTLE

(71) Applicant: B&R INDUSTRIAL AUTOMATION GMBH, Eggelsberg (AT)

(72) Inventor: Michael Reinthaler, Eggelsberg (AT)

(73) Assignee: ABB SCHWEIZ AG, Baden (CH)

( * ) Notice: Subject to any disclaimer, the term of this patent is extended or adjusted under 35 U.S.C. 154(b) by 273 days.

(21) Appl. No.: 18/021,970

(22) PCT Filed: Jan. 28, 2021

(86) PCT No.: PCT/EP2021/051940
§ 371 (c)(1),
(2) Date: Feb. 17, 2023

(87) PCT Pub. No.: WO2022/037806
PCT Pub. Date: Feb. 24, 2022

(65) Prior Publication Data
US 2023/0361663 A1      Nov. 9, 2023

(30) Foreign Application Priority Data

Aug. 19, 2020      (AT) .............................. A 50700/2020

(51) Int. Cl.
*H02K 41/03*           (2006.01)
(52) U.S. Cl.
CPC .................................. *H02K 41/031* (2013.01)
(58) Field of Classification Search
CPC .... H02K 1/02; H02K 41/031; H02K 2201/06; H02K 2213/03

(Continued)

(56) References Cited

U.S. PATENT DOCUMENTS 5,648,691 A      7/1997   Takei
5,744,879 A  *   4/1998   Stoiber ................ H02K 41/031
                                            310/12.21

(Continued)

FOREIGN PATENT DOCUMENTS

DE      10 2006 033 718         1/2008
DE      10 2016 218 777         5/2017

(Continued)

OTHER PUBLICATIONS

Translation of foreign document JP 2017022937 A (Year: 2017).*

(Continued)

*Primary Examiner* — Alex W Mok
(74) *Attorney, Agent, or Firm* — GREENBLUM & BERNSTEIN, P.L.C.

(57) ABSTRACT

A permanent magnet arrangement of a shuttle for a linear and/or planar motor. The permanent magnet arrangement includes a large number of permanent magnets arranged on at least one magnet area. The permanent magnets form an alternating sequence of magnetic strips of different polarities in a central region of the magnet area. At least one end magnet body is arranged at an edge of the magnet area between the central region and the edge and changes the course of the magnetic field formed by the permanent magnets in the central region, along the edge that varies over the length of the edge. The at least one edge has at least two polarity regions having different polarities, and the mutual attraction force between two identical permanent-magnet arrangements arranged next to one another with parallel edges is reduced by the changed magnetic field.

17 Claims, 5 Drawing Sheets

Figure 1:
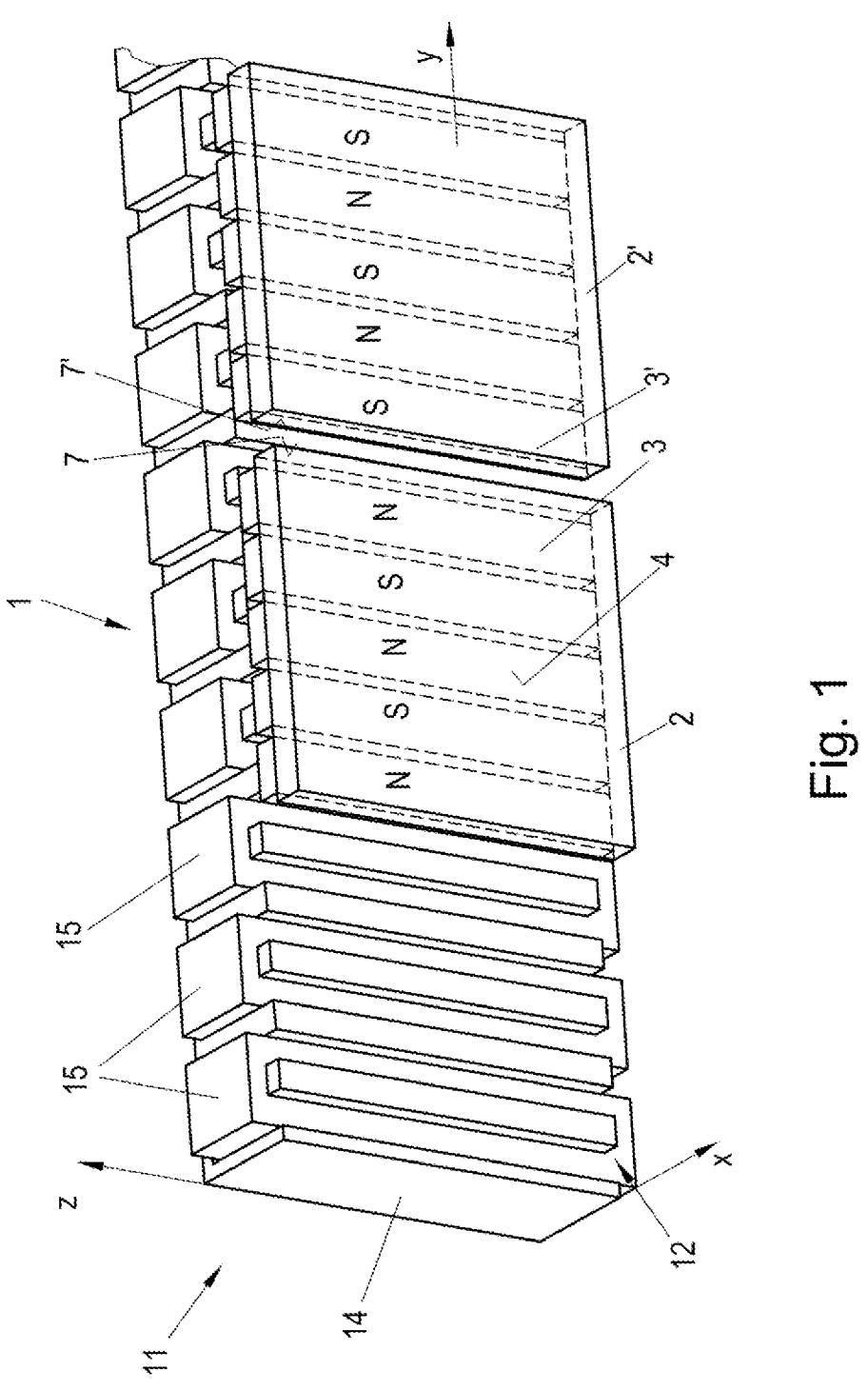

(58) Field of Classification Search
 USPC ...................................................... 310/12.24
 See application file for complete search history.

(56)                    References Cited

U.S. PATENT DOCUMENTS

| | | | | | |
|---|---|---|---|---|---|
| 5,831,352 | A | * | 11/1998 | Takei | ..................... H02K 41/03 |
| | | | | | 310/12.24 |
| 6,188,147 | B1 | | 2/2001 | Hazelton et al. | |
| 6,528,907 | B2 | * | 3/2003 | Hwang | ................... F28D 15/02 |
| | | | | | 310/16 |
| 6,803,681 | B2 | * | 10/2004 | Faizullabhoy | ......... H02K 41/03 |
| | | | | | 318/135 |
| 7,362,012 | B2 | * | 4/2008 | Godkin | .................. H02K 41/03 |
| | | | | | 310/12.25 |
| 7,456,529 | B2 | * | 11/2008 | Faizullabhoy | ....... H02K 41/031 |
| | | | | | 318/135 |
| 7,876,062 | B2 | * | 1/2011 | Takeuchi | .................. H02P 6/34 |
| | | | | | 318/400.42 |
| 8,134,273 | B2 | | 3/2012 | Vollmer et al. | |
| 8,402,899 | B2 | * | 3/2013 | Loeser | .................... B60L 13/03 |
| | | | | | 104/282 |
| 2001/0054851 | A1 | | 12/2001 | Tsuboi et al. | |
| 2004/0239194 | A1 | * | 12/2004 | Thirunarayan | ........ H02K 41/03 |
| | | | | | 310/12.24 |
| 2006/0138872 | A1 | * | 6/2006 | Thirunarayan | ........ H02K 41/03 |
| | | | | | 310/12.01 |
| 2007/0052303 | A1 | * | 3/2007 | Thirunarayan-Kumar | .................. |
| | | | | | H02K 1/27 |
| | | | | | 310/12.25 |
| 2018/0212505 | A1 | | 7/2018 | Ding | |

FOREIGN PATENT DOCUMENTS

| | | |
|---|---|---|
| EP | 1 168 585 | 1/2002 |
| EP | 2 037 555 | 3/2009 |
| EP | 2 709 249 | 3/2014 |
| JP | 2017-022937 | 1/2017 |
| WO | 2017/0010552 | 1/2017 |

OTHER PUBLICATIONS

Austria Search Report conducted in counterpart Austria Appln, No. A 50700/2020 (Aug. 19, 2020).

Int'l Search Report (Form PCT/ISA/210) conducted in Int'l Appln. No. PCT/EP2021/051940 (May 7, 2021).

Int'l Written Opinion (Form PCT/ISA/237) conducted in Int'l Appln. No. PCT/EP2021/051940 (May 7, 2021).

Int'l Prelim. Exam. Report (Form PCT/IPEA/409) conducted in Int'l Appln. No. PCT/EP2021/051940 (Nov. 30, 2022).

* cited by examiner

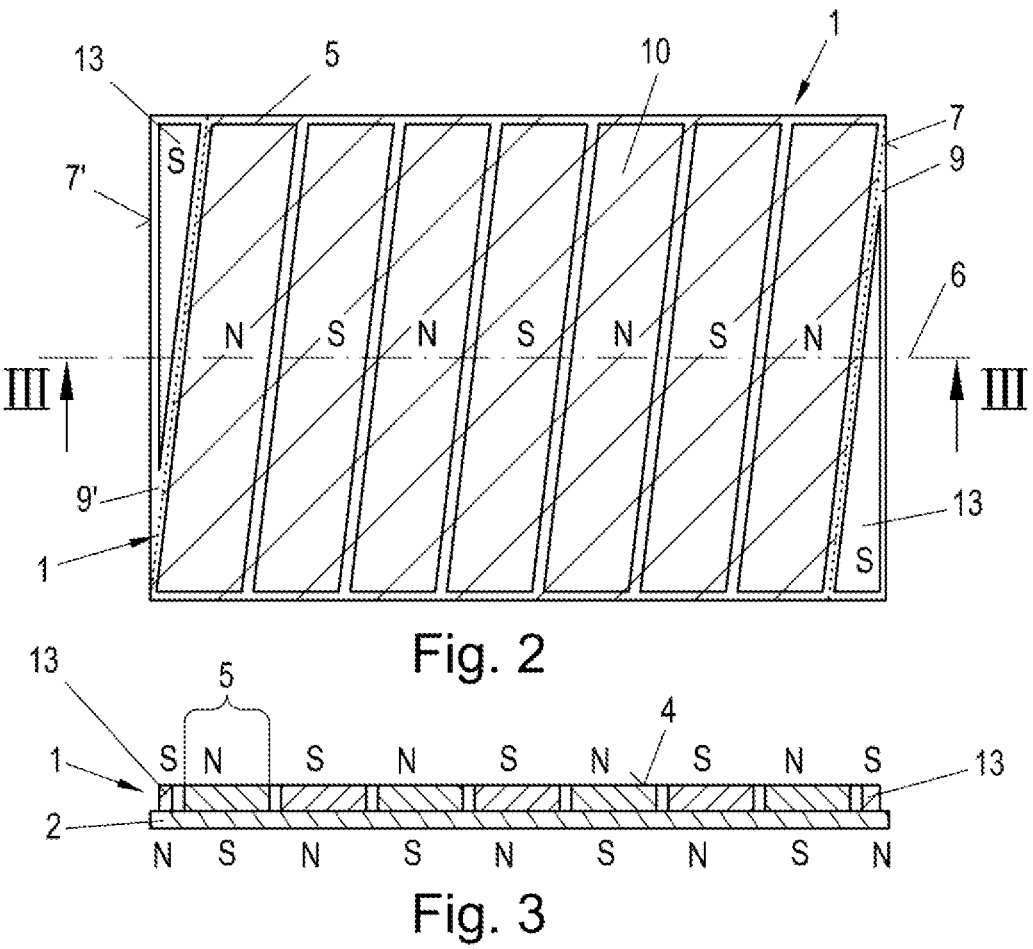
Fig. 2
Fig. 3
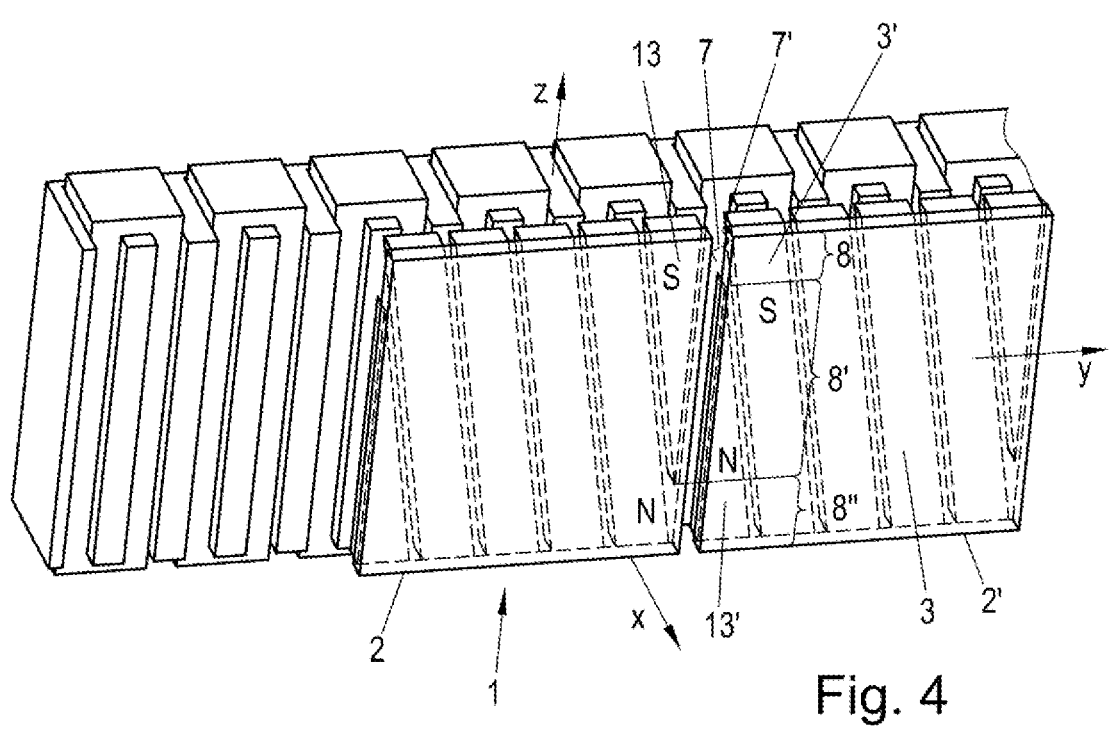
Fig. 4

PERMANENT MAGNET ARRANGEMENT OF A SHUTTLE

The present disclosure relates to a permanent magnet arrangement of a shuttle for a linear and/or planar motor, to a shuttle, to a planar motor, and to a linear motor.

Shuttles of planar motors and linear motors are held in position over a stator surface by means of magnetic fields generated in stators and are moved over this stator surface by a controlled change in the magnetic fields. The stators have a plurality of coils and the shuttles have a plurality of permanent magnets arranged in a magnet area. The permanent magnets have a pattern of magnetic strips having different polarities. The arrangement and the polarity pattern of the permanent magnets of a shuttle are referred to herein as a permanent magnet arrangement.

In connection with the present disclosure, an arrangement having at least one stator and at least one shuttle is referred to as a "linear motor", wherein the shuttle is movable along a defined line by means of the stator. Typically, linear motors have a guide structure, in which the shuttles engage, for example with wheels or sliding elements, and which keep the shuttle on the intended path.

In connection with the present disclosure, an arrangement having at least one stator and at least one shuttle is referred to as a "planar motor", wherein the shuttle is movable by means of the stator in at least one plane defined by the stator. Planar motors are usually able to keep the shuttle "floating" above a stator plane by means of controlled magnetic fields, wherein, apart from the movement in the plane, movements in the other degrees of freedom can also be possible.

If two shuttles are arranged close to one another, undesired mutual influencing of the shuttles can occur. As a result of the attractive or repulsive effect of permanent magnets of different shuttles, uncontrolled movement can occur on the travel path, for example when the stator coils become current-free. For example, the shuttles can then move away from one another or be attracted to one another in an uncontrolled manner. When a permanent magnet arrangement is used as a position track for position detection, the magnetic fields of permanent magnet arrangements of adjacent shuttles can also influence one another apart from the attractive or repulsive effect of the permanent magnets, which can impede or falsify position detection.

It is an object of the present disclosure to provide devices and methods with which the occurrence of such effects can be at least reduced.

These and further objects are achieved according to a first aspect of a permanent magnet arrangement of a shuttle for a linear and/or planar motor, wherein the permanent magnet arrangement comprises a plurality of permanent magnets that are arranged on at least one magnet area, wherein the permanent magnets form an alternating sequence of magnetic strips of different polarities in a central region of the magnet area, wherein at least one end magnet body is arranged at an edge of the magnet area in an edge area provided between the central region and the edge, which end magnet body changes the course of the magnetic field formed by the permanent magnets in the central region along the edge in a manner that varies over the length of the edge, or the at least one end magnet body is embodied as a magnetic short-circuiting element that guides the magnetic field, which is formed by the permanent magnets in the central region, along the edge, wherein the mutual attraction or repulsion force between two permanent magnet arrangements that are arranged next to one another with preferably parallel edges is reduced by the changed magnetic field. At the same time, in particular when magnetic short-circuiting elements are used, it can be achieved that the magnetic fields of permanent magnet arrangements of adjacent shuttles do not negatively influence one another, which is particularly advantageous for the use of the permanent magnet arrangement for position detection. As a result, it is possible to reduce the minimum distance that is permitted during operation between two shuttles having in each case a corresponding permanent magnet arrangement. The permanent magnet arrangement is effective not only in the case of two identical permanent magnet arrangements arranged next to one another, but rather the particular embodiment also causes a reduction of the attraction or repulsion force between a permanent magnet arrangement according to the invention and a conventional or different permanent magnet arrangement. A second permanent magnet arrangement, the edge of which is designed in an analogous manner, can be referred to as "similar" to a first permanent magnet arrangement, irrespective of whether or not the two permanent magnet arrangements are otherwise identical.

Advantageously, the mutual attraction force can be reduced by the changed magnetic field by more than 50%, preferably by more than 70% and in particular by more than 90%. As a result, the permanent magnet arrangement can be adapted to the required conditions.

According to a further advantageous embodiment, the at least one edge can have at least two polarity regions of different polarities. As a result, the reduction of the mutual attraction force can be maximized.

In an advantageous manner, polarity regions having an attractive magnetic effect and polarity regions having a repulsive magnetic effect can alternate along the at least one edge of the permanent magnet arrangement and the further edge of the similar permanent magnet arrangement arranged parallel thereto. This makes it possible to reduce the magnetic attraction force between the shuttles essentially to zero. By means of a suitable arrangement of the polarity regions, it is also possible to achieve a minimization of magnetic forces if the two opposite edges are arranged slightly offset from one another.

In a further advantageous embodiment, the magnetic forces between the two similar permanent magnet arrangements arranged next to one another can substantially balance each other out. Undesired interactions between two adjacent permanent magnet arrangements can thus be prevented. "Substantially balance each other out" is understood here to mean that the magnetic forces have a value that is practically negligible in relation to the maximum propulsive force of the shuttle on the stator. This is the case in particular when the magnetic force has a value that is less than 10%, in particular less than 5% of the maximum achievable propulsive force.

The magnet area can advantageously have a main axis that crosses the magnetic strips and defines a preferred direction or movement direction of the shuttle and wherein the edge crosses the main axis. This allows, especially in the case of linear motors, an advantageous arrangement of permanent magnets in the permanent magnet arrangement, wherein the main axis is arranged parallel to the direction of movement. In planar motors, the main axis can define a preferred direction.

According to a further advantageous embodiment, the surface of the end magnet body arranged in the edge area can be asymmetrical with respect to the main axis and preferably have a substantially ramp-like shape. This allows good utilization of the area available in the magnet area. Preferably, the shape of the end magnet body (and/or the projection of the end magnet body on the magnet area) has a center of gravity that is at a distance from the main axis.

In an advantageous manner, the magnetic strips can each have a longitudinal axis that crosses the main axis of the magnet area at an angle of between 45° and 90°. As a result, the pole-sensitivity ("cogging") can be minimized.

In an advantageous manner, at least one end magnet body can have a permanent magnetic material. Optionally, at least one end magnet body can have a material selected from a magnetized or non-magnetized magnetizable material, such as ferrites or neodymium-iron-boron. In this case, it is important that the material is suitable for changing the magnetic field built up by the permanent magnets in the desired manner.

In a further aspect, the present disclosure relates to a shuttle for a linear and/or planar motor having at least one permanent magnet arrangement according to an embodiment disclosed herein.

In a further aspect, the present disclosure relates to a linear motor having at least one stator and at least one shuttle arranged thereon according to an embodiment disclosed herein.

In yet another aspect, the present disclosure relates to a planar motor having at least one stator and at least one shuttle arranged thereon according to an embodiment disclosed herein.

Figure 5:
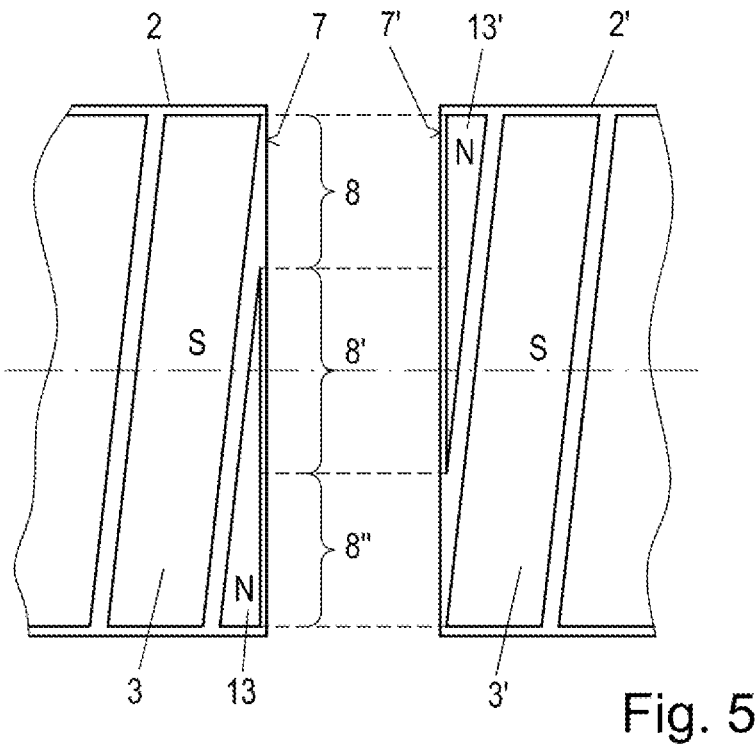
Figure 8:
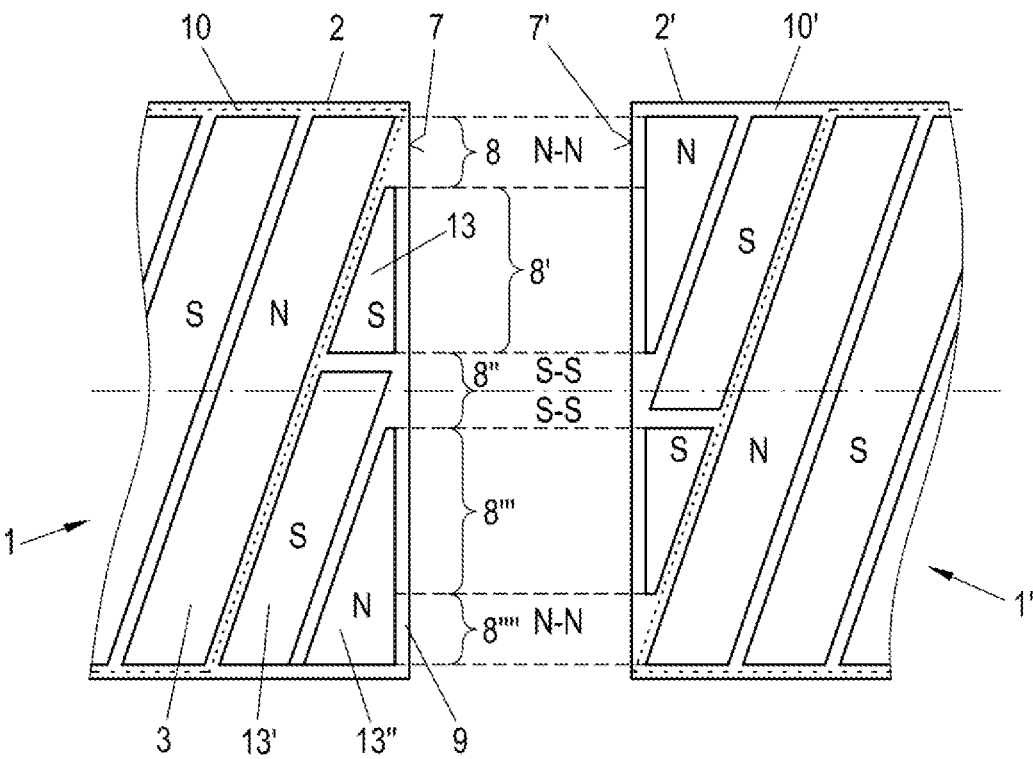
Figures 6, 7:
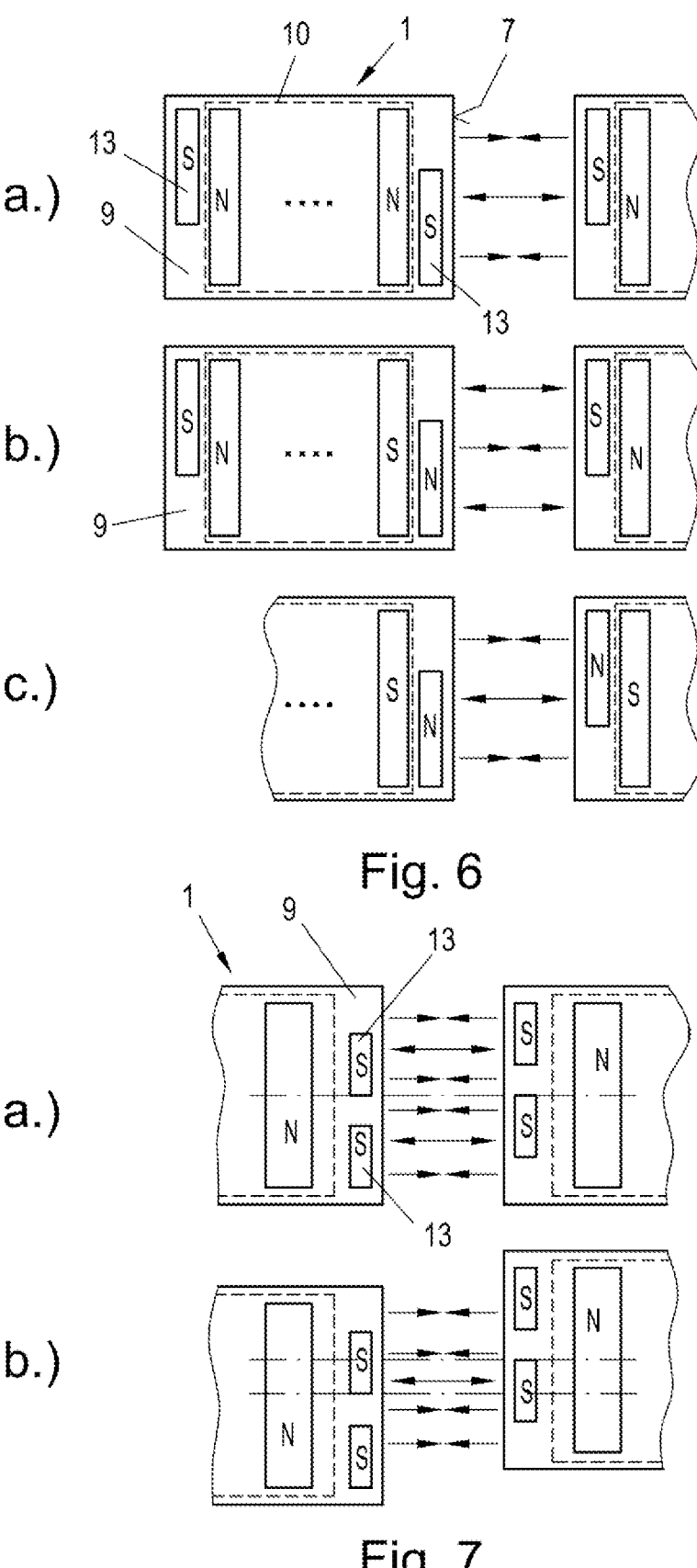
Figure 9:
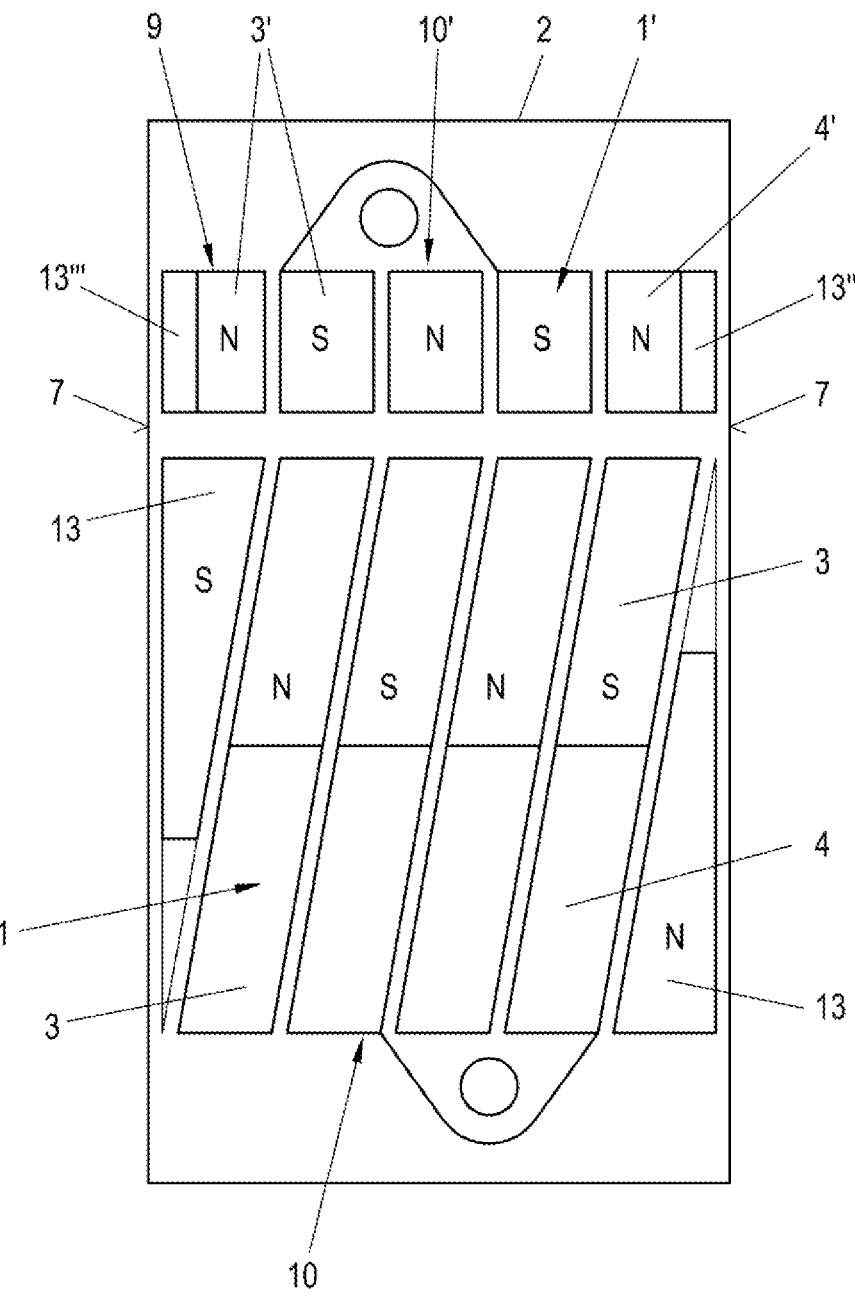

The present invention is described in greater detail below with reference to FIGS. 1 to 9, which show schematic and non-limiting advantageous embodiments of the invention by way of example. The following are shown:

FIG. 1 is a schematic diagrammatic representation of a linear stator motor having shuttles according to the prior art, FIG. 2 is a representation of a shuttle having a permanent magnet arrangement in a plan view, FIG. 3 is a sectional view of the shuttle along the line III-III in FIG. 2, FIG. 4 is a schematic diagrammatic representation of a linear stator motor having shuttles according to the present disclosure, FIG. 5 is a schematic representation of two opposite edges of permanent magnet arrangements, FIG. 6 is a schematic representation of an alternative embodiment of a permanent magnet arrangement having rectangular end magnet bodies, FIG. 7 is a further schematic representation of an alternative embodiment of a permanent magnet arrangement having rectangular end magnet bodies, wherein the number of polarity regions is increased, FIG. 8 is a further schematic representation of an alternative embodiment of a permanent magnet arrangement having a plurality of triangular end magnet bodies, wherein the number of polarity regions is increased, FIG. 9 shows the use of an end magnet body in the form of a magnetic short-circuiting element in a permanent magnet arrangement.

FIG. 1 is a schematic representation of a linear motor 11 having a stator 14 in which a plurality of coils 15 are provided, according to the prior art. The coils 15 of the stator 14 are in each case elongated parallel to the z-axis (in the orientation shown in FIG. 1), wherein the longitudinal axes of the coils 15 are in each case arranged parallel to one another. Depending on the current flow direction, an electromagnetic field having a desired polarity can be generated with each coil 15. The energization of the coils 15 is controlled in such a way that magnetic fields with variable strength and/or polarity can be created on a stator surface 12 (which in the case shown is parallel to the y-z plane).

Two shuttles 2, 2' are arranged above the stator surface 12 and each have a permanent magnet arrangement 1 that interacts with the magnetic fields of the stator 14. The permanent magnet arrangement 1 has a number of parallel permanent magnets 3, which form a front and a rear magnet area 4. The magnet areas 4 of the permanent magnet arrangements 1 of the shuttles 2 are arranged substantially parallel to the stator surface 12, wherein an air gap is usually provided between the stator surface 12 and the magnet area 4 facing the stator in order to avoid friction between the shuttle 2 and the stator 14. Due to the arrangement of the magnet area 4 on both sides, stators 14 can be arranged on only one side of the shuttle 2 or on both sides. As a result, switches or sections having higher maximum acceleration can be implemented, for example. Other systems have shuttles whose permanent magnet arrangement forms a magnet area 4 on one side only, which can be arranged facing the stator. Exemplary embodiments of such shuttles and stators in linear and planar motors are known to a person skilled in the art and therefore do not have to be described in more detail herein.

The permanent magnets 3 lying parallel to one another each have alternating polarities, such that a pattern of magnetic strips 5 having alternating polarities (N, S, N, S, etc.) results in the magnet area 4. By means of a controlled switching of the coils 15, the shuttles 2 can be moved along the movement direction (i.e., parallel to the y-axis). In linear motors 11, the shuttles 2 are usually guided on a guide structure (not shown), which defines the direction of movement and ensures the air gap between the shuttle 2 and the stator.

In the above-described embodiment of the permanent magnet arrangement 1, an undesired effect will occur if the two shuttles 2, 2' come too close to each other: as soon as the two parallel edges 7, 7' approach one another, the adjacent permanent magnets 3, 3' of the two shuttles 2, 2' either exert an attraction force on one another (if they have different polarities, as shown in FIG. 1), or they repel each other (if they have the same polarity). For this reason, it must always be ensured that the shuttles assume a sufficient distance from one another, which can, for example, be solved structurally, for example in that the edges 7, 7' project slightly beyond the actual magnet areas 4 and thereby force a "safety distance" between the two permanent magnet arrangements 1 when the two edges 7, 7' abut one another. However, this restricts the possible size of the magnet area 4, which then cannot extend up to the edges.

According to the present disclosure, it is therefore proposed to selectively change the course of the magnetic field that is generated by the permanent magnet arrangement 1 along the edge 7 in such a way that the attraction force between two shuttles adjacent to one another with their edges 7, 7' is reduced to such an extent that the mutual attraction or repulsion no longer poses a problem even at a small distance. To change the magnetic field course, end magnet bodies 13 arranged in the vicinity of the edge 7 of the magnet area 4 are used. There are numerous possibilities for an advantageous arrangement of said end magnet bodies 13, some of which are described below with reference to a plurality of examples.

FIG. 2 shows an example of a permanent magnet arrangement 1 in a plan view. FIG. 3 shows a sectional view of said permanent magnet arrangement 1 along the line III-III shown in FIG. 2, which is also referred to herein as the main axis 6 of the permanent magnet arrangement 1. Directional information, for example of edges and borders that run parallel to the main axis 6, is referred to as "longitudinal" in connection with the present disclosure and not in a limiting manner. Directional information transversely to the main axis 6 is referred to as "transverse."

In a rhombic central region 10 of the magnet area 4 of the permanent magnet arrangement 1, a plurality of permanent magnets 3 having alternating polarities are arranged parallel to one another, wherein the magnetic strips 5 formed by the permanent magnets 3 are likewise rhombic in order to exploit the area of the central region 10 in the best possible manner.

In connection with the present disclosure, the projection of the permanent magnets 3 onto the magnet area 4 is referred to as magnetic strips 5. In this case, the magnetic strips of two adjacent permanent magnets having the same polarity can optionally be regarded as a single magnetic strip.

The orientation of the longitudinal axes of the permanent magnets 1 deviates from the normal with respect to the main axis 6, for example by approximately 10°-20°. This inclination improves the pole-sensitivity ("cogging") with respect to the stator 14. The optimum angle of inclination is dependent on the width and length of the magnetic strips 5, the number of permanent magnets 3 and the design of the stator 14. Such an inclination of the permanent magnets 3 is known per se from the prior art, for example from U.S. Pat. No. 6,791,214 B2.

The edges 7, 7' of the permanent magnet arrangement 1 extending transversely to the main axis 6 form a right angle with the main axis 6, such that an edge area 9, 9' is formed between the longitudinal edges of the outermost magnetic strips 5 of the central region 10 and the edges 7, 7', which edge area 9, 9', in the case shown in FIG. 2, has a substantially triangular shape tapering toward a longitudinal side. An end magnet body 13 is provided in each edge area 9, 9', which end magnet body also has a substantially triangular or ramp-like shape. The end magnet body 13 extends only along a part of the edge 7 and thus, also due to the tapering shape, effects a change in the magnetic field generated by the permanent magnets 3 of the central region 10, which change varies along the course of the edge 7.

In connection with the present disclosure, a change in the magnetic field that varies along the course of the edge refers to a change that changes the magnetic field in different positions of the edge 7 in different ways.

In this context, it is pointed out that both the permanent magnets 3 and the end magnet bodies 13 can be permanent magnets in the proper sense of the term. The material used for the permanent magnets and the end magnet bodies can be identical, and preferably the two types of magnets differ only in terms of their position and/or shape. While the permanent magnets would have to be magnetic due to the necessary interaction with the stators, it can also be sufficient, however, for an end magnet body if it is not magnetic itself, but consists of a material that influences the properties of the magnetic field generated by the permanent magnets sufficiently strongly in order to achieve the effect according to the invention. For example, the end magnet body may comprise a ferromagnetic material, such as ferrites or neodymium-iron-boron. A person skilled in the art, knowing the teachings disclosed herein, will be able to select suitable materials for the end magnet body that are capable of sufficiently influencing the magnetic field.

FIG. 4 shows two shuttles 2, 2', wherein the right-hand edge 7 of the first shuttle 2 arranged on the left in the image and the left-hand edge 7' of the right shuttle 2' are arranged parallel to one another at a short distance. The course of the magnetic forces along the two edges 7, 7' can be divided into a plurality of polarity regions 8, 8', 8" in which edges of permanent magnets 3 or end magnet bodies 13 having different polarity combinations are opposite each other. A first polarity region 8 extends first from top to bottom (relative to the representation in FIG. 4), in which first polarity region a permanent magnet 3' and an end magnet body 13 adjoin one another, each having the same polarity (S-S). This produces a repulsive effect between the two shuttles 2, 2' in this polarity region 8. In the following (central) polarity region 8', two end magnet bodies 13, 13' having different polarities (S-N) are adjacent to one another. In this polarity region 8', the magnetic field causes attraction between the two shuttles 2, 2'. Under this follows a third polarity region 8" having the same polarities between a permanent magnet 3 and an end magnet body 13' (N-N), which bring about a repulsive magnetic force.

Overall the magnetic forces acting between the two shuttles 2, 2' substantially balance each other out due to the different polarity regions 8, 8', 8", even if the distance between the two shuttles 2, 2' is minimal.

Because the shape of the three-dimensional magnetic field generated by the permanent magnet arrangements 1, 1' of the shuttles 2, 2' illustrated in FIG. 4 is very complex in reality, the effect described above of the alternating polarity regions is in reality more complex than shown herein. In particular, the closely adjacent edges 7, 7' also generate forces between the two shuttles 2, 2', which forces can act along the z-axis and the x-axis, and torques can also occur about all axes. However, the inventors have found that these other forces and moments are, on the one hand, less disruptive than the attractive and repelling forces along the y-axis (i.e., along the main axis 6), and on the other hand, with an arrangement according to the teaching disclosed herein, it is possible to find and set a coordinated and minimized force and torque ratio in all axes.

In FIG. 4, the two shuttles 2, 2' arranged next to one another have end magnet bodies 13, 13' having different polarities at their adjacent edges 7, 7. However, this is not a necessary condition since an advantageous sequence of different polarity regions also results when the opposite end magnet bodies 13, 13' have the same polarity. FIG. 5 shows an exemplary embodiment.

FIG. 5 shows, in a schematic plan view, two shuttles 2, 2' that are arranged next to one another, wherein the two opposite edges 7, 7' of the shuttles 2, 2' are arranged parallel to one another. The right-hand end magnet body 13 of the first shuttle has the same polarity (N) as the left-hand end magnet body 13' of the second shuttle 2', wherein the two end magnet bodies 13, 13' are adjacent to one another only in the central polarity region 8' and generate a repelling magnetic force there. In the first polarity region 8 (shown above in FIG. 5), the rightmost of the permanent magnets 3 in the central region 10 of the left-hand shuttle 2 (polarity "S") is adjacent to the upper region of the left-hand end magnet body 13' of the right-hand shuttle 2' (polarity "N"), wherein an attractive magnetic force is generated. In the third, lower polarity region 8", the right-hand end magnet body 13 of the left-hand shuttle 2 is adjacent to the permanent magnets 3 arranged on the left in the central region 10 of the right-hand shuttle 2', wherein an attractive magnetic force is generated too. The magnetic forces parallel to the main axis 6 thus also substantially balance each other out here.

Because the effect according to the invention functions with different "final polarities" in the cases described above with reference to FIGS. 2 to 5, shuttles having permanent magnet arrangements 1 of different lengths and having an even or odd number of magnetic strips 5 can be arranged next to one another on the same linear motor, wherein the effect according to the invention results from any arrangement of adjacent edges 7.

FIG. 6 schematically shows a further variant of a permanent magnet arrangement 1 having a rectangular arrangement of the central region 10, wherein the permanent magnets 3 are arranged in the central region parallel to the edge 7 or at a right angle to the main axis 6. The permanent magnets 3 in the central region 10 correspond substantially to an arrangement according to the prior art, as is shown in FIG. 1. On both sides of the central region, however, an end magnet body 13 is arranged between the respective edge 7 and the last permanent magnet 3 of the central region 10, which magnet body in turn has a rectangular shape. However, the end magnet body 13 does not extend over the entire width of the permanent magnet arrangement 10 defined by the edge 7, but only from one side over somewhat more than half of the edge, for example over two thirds of the edge. The optimum length of the end magnet bodies 13 is also dependent on other parameters, such as the width and design of the permanent magnets 3 and the width and design of the end magnet bodies 13, which can differ from that of the permanent magnets 3. This embodiment also works with end magnet bodies of different or identical polarities, and the permanent magnet arrangements 10 can also be "turned around" so that they can be used both ways.

FIG. 7 shows an alternative embodiment, wherein a plurality of end magnet bodies 13 are arranged in each edge area 9. The edge area 9 is divided with respect to the edge 7 into a plurality of sections distributed regularly or irregularly over the edge 7 (two sections of the same width in FIG. 7), in each of which an end magnet body 13 is arranged, the edge of which extends over one part of the corresponding sections but keeps another part free. This corresponds approximately to the embodiment shown in FIG. 6, but with a smaller subdivision of the polarity regions 8. This can be advantageous, for example, if the two adjacent shuttles 2, 2' are arranged slightly offset from one another, as schematically illustrated in FIG. 7b. Although the effect of the sequence of attracting and repelling polarity regions is less than in the case of an arrangement in which said shuttles are aligned with one another (FIG. 7a), it is still present to a sufficient extent. This can be advantageous not only in conjunction with linear motors, but also, for example, in connection with planar motors, because in the case of such planar motors it can happen more often that shuttles 2 are arranged offset to one another.

A subdivision of the edge 7 into a plurality of smaller sections is also possible in conjunction with permanent magnets 3 oriented obliquely to the main axis 6 and shown by way of example in FIG. 8. The alternating sequence of permanent magnets 3 having different polarities is again arranged in a central region 10, wherein a substantially triangular or ramp-like edge area 9 forms between the edge 7 and the last permanent magnet 3 of the central region (here: polarity "N"). The edge area 9 can be divided into a narrower triangular section on one side of the main axis 6 and a wider section on the other side that substantially has the shape of a right-angled trapezoid. In the first, narrower section, a first end magnet body 13' (polarity "S") is arranged with a ramp-like surface that extends along the edge 7 only over a partial region of the section (similar to the embodiment described above with reference to FIG. 2 to 5). In the second, trapezoidal section, a rhombic second end magnet body 13' is arranged in parallel adjacent to the last permanent magnets 3 of the central region 10 (polarity "S"), the shape of which rhombic second end magnet substantially corresponds to that of the permanent magnets 3 in the central region 10, but which extends only on the one side of the main axis 6 substantially over the entire width of the section. The second end magnet body 13' can optionally also differ with respect to its width from the permanent magnets 3 of the central region 10. A third end magnet body 13" (polarity: "N"), which again has a ramp-like design, is arranged between the second end magnet body 13' and the edge 7 in the trapezoidal section and extends along the edge 7 only over a partial region of the section.

If a permanent magnet arrangement 1' of a similar design is arranged parallel to said permanent magnet arrangement 1, a plurality of polarity regions 8 to 8"" will again be formed, which alternately generate attractive and repulsive magnetic forces. The embodiment shown by way of example in FIG. 8 is suitable in particular for large, wide permanent magnet arrangements 1. Due to the increased number of polarity regions compared to FIG. 5, the effect of the end magnet bodies 13 can also be at least partially maintained when permanent magnet arrangements 1 are arranged offset to one another, such that the mutual magnetic attraction or repulsion is reduced.

By increasing the number of end magnet bodies 13 arranged in the triangular edge area 9 and reducing their respective area, further polarity regions could also be created. For example, the edge area 9 can be divided into three, four or more sections in which a triangular end magnet body 13 is arranged in each case and wherein the rest of the edge area 9 therebehind is supplemented with trapezoidal end magnet bodies 13 according to the pattern described above.

A further embodiment of a permanent magnet arrangement according to the invention is shown in FIG. 9, which shows a shuttle 2 of a linear motor 11. In this embodiment, two permanent magnet arrangements 1, 1' are arranged on the shuttle 2. The permanent magnet arrangement 1 can be arranged as described above with reference to FIGS. 2 to 8, can, however, also be used without an end magnet body 13, as shown, for example, in FIG. 1. In this case, the permanent magnet arrangement 1 comprises the drive magnets that interact with the coils 15 of the linear motor 11 to move and drive the shuttle 2. In this embodiment, the permanent magnet arrangement 1' comprises position magnets 3' whose magnetic field is detected by position sensors (for example magnetostrictive sensors, magnetoresistive sensors, Hall sensors) that are arranged along the stator 14 in order to be able to determine the position of the shuttle 2 on the stator 14. It should be noted that only the permanent magnet arrangement 1' could be provided on the shuttle 2, which permanent magnet arrangement can then again form drive magnets that could also be used simultaneously for position detection.

The permanent magnet arrangement 1' again has a number of parallel permanent magnets 3' that form a magnet area 4' that is arranged substantially parallel to the stator surface 12, wherein an air gap is usually provided between the stator surface 12 and the magnet area 4' facing the stator. The permanent magnets 3' arranged parallel to one another each have alternating polarities, such that in a central region 10' of the magnet area 4' a pattern of magnetic strips having alternating polarities (N, S, N, S, etc.) results in the magnet area 4'. An end magnet body 13''' is arranged in an edge area 9 between the central region 10' and the edge 7 of the magnet area 4' (in FIG. 9, for example, at both edges 7). It should be noted that the edges 7 of the two permanent magnet arrangements 1, 1' do not necessarily have to be the same. Different edge areas 9 of the magnet areas 4, 4' can of course also result.

The end magnet body 13''' of the permanent magnet arrangement 1' in FIG. 9 is designed as a magnetic short-circuiting element, for example in the form of a ferromagnetic material, such as a ferrite or neodymium-iron-boron material. The magnetic short-circuiting element serves to guide the magnetic field of the permanent magnet arrangement 1' in the region of the edge area 9 via the end magnet body 13''' and, for this purpose, has a magnetic permeability that is greater (preferably significantly greater) than that of air. A person skilled in the art will be able to select a suitable magnetic material for the end magnet body 13''' to guide the magnetic field as desired. By guiding the magnetic field of the permanent magnet arrangement 1' via the end magnet body 13''', the permanent magnet arrangements 1' of two shuttles 2 adjacent on the stator 14 do not influence one another.

An end magnet body 13''' in the form of a magnetic short-circuiting element, as described with reference to FIG. 9, can be used both in a permanent magnet arrangement for position detection and for driving the shuttle 2.

The individual features and variants specified in the individual configurations and examples can (unless otherwise stated then and there) be freely combined with those of the other examples and configurations, and can be used in particular to characterize the invention in the claims, without necessarily including the other details of the relevant design or the relevant example.

The invention claimed is:

1. A permanent magnet arrangement of a shuttle for a linear and/or planar motor, comprising:

a plurality of permanent magnets arranged on at least one magnet area forming an alternating sequence of magnetic strips of different polarities in a central region of the at least one magnet area, wherein the at least one magnet area has a main axis that crosses the magnetic strips and defines a preferred direction or movement direction of the shuttle and wherein an edge of the at least one magnet area crosses the main axis;

at least one end magnet body is arranged at the edge of the magnet area in an edge area provided between the central region and the edge of the at least one magnet area, and is configured to include a longitudinal length extending along only a part of the edge of the magnet area; and the at least one end magnet body being arranged between the edge of the magnet area and the central region produces a different magnetic field at different positions along a length of the edge of the magnet area, and produces at least two polarity regions having different polarities along the edge of the at least one magnet area, and wherein a mutual attraction or a repulsion force between edges of two permanent magnet arrangements arranged next to one another is reduced by the the different magnetic field at the different positions along the length of the edge of the magnet area.

2. The permanent magnet arrangement according to claim 1, wherein the mutual attractive force is reduced by the changed magnetic field by more than 50%.

3. The permanent magnet arrangement according to claim 2, wherein the mutual attractive force is reduced by the changed magnetic field by more than 70%.

4. The permanent magnet arrangement according to claim 2, wherein the mutual attractive force is reduced by the changed magnetic field by more than 90%.

5. The permanent magnet arrangement according to claim 1, wherein polarity regions having an attractive magnetic effect and polarity regions having a repulsive magnetic effect alternate along the at least one edge of the permanent magnet arrangement and the further edge of the similar permanent magnet arrangement arranged parallel thereto.

6. The permanent magnet arrangement according to claim 1, wherein the magnetic forces between the two similar permanent magnet arrangements arranged next to one another substantially balance out each other.

7. The permanent magnet arrangement according to claim 1, wherein the surface of the end magnet body arranged in the edge area is asymmetrical with respect to the main axis.

8. The permanent magnet arrangement according to claim 7, wherein the surface of the end magnet body arranged in the edge area has a substantially ramp-like shape.

9. The permanent magnet arrangement according to claim 1, wherein the magnetic strips each have a longitudinal axis that crosses the main axis of the magnet area at an angle of between 45° and 90°.

10. The permanent magnet arrangement according to claim 1, wherein at least one end magnet body has a permanent magnetic material.

11. The permanent magnet arrangement according to claim 1, wherein at least one end magnet body has a material selected from a magnetized or non-magnetized magnetizable material.

12. The permanent magnet arrangement according to claim 11, the non-magnetized magnetizable material comprises ferrites or neodymium-iron-boron.

13. A shuttle for a linear and/or planar motor having at least one permanent magnet arrangement according to claim 1.

14. A linear motor having at least one stator and at least one shuttle according to claim 13 arranged thereon.

15. A planar motor having at least one stator and at least one shuttle according to claim 13 arranged thereon.

16. The permanent magnet arrangement according to claim 1, wherein the edges of the two permanent magnet arrangements are parallel to each other.

17. An arrangement of a linear and/or planar motor comprising, a plurality of shuttles, each of the plurality of shuttles comprising:

a plurality of permanent magnets arranged on at least one magnet area forming an alternating sequence of magnetic strips of different polarities in a central region of the at least one magnet area, wherein the at least one magnet area has a main axis that crosses the magnetic strips and defines a preferred direction or movement direction of the shuttle and wherein an edge of the at least one magnet area crosses the main axis; and at least one end magnet body is arranged in an edge area of the at least one magnet area located between the central region and the edge of the at least one magnet area and is configured to include a longitudinal length extending along only a part of the edge of the magnet area, the at least one end magnet body being arranged between the permanent magnets in the central region and the edge of the at least one magnet area to produce different magnetic fields at different positions along a length of the edge of the at least one magnet area and to produce at least two polarity regions having different polarities over a length of the edge of the at least one magnet area, and at least two of the plurality of shuttles being arranged next to each other so that respective edges of the at least two shuttles are arranged next to each other with counteracting attraction and repulsion forces between the respective edges of the at least two shuttles.

\* \* \* \* \*